(12) United States Patent
Norris

(10) Patent No.: US 9,234,614 B2
(45) Date of Patent: Jan. 12, 2016

(54) ASSEMBLY FOR COUPLING A PAIR OF DOUBLE-WALLED TUBES

(71) Applicant: Electro-Motive Diesel, Inc., LaGrange, IL (US)

(72) Inventor: Nicholas Denman Norris, Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 66 days.

(21) Appl. No.: 14/269,696

(22) Filed: May 5, 2014

(65) Prior Publication Data

US 2015/0316186 A1 Nov. 5, 2015

(51) Int. Cl.
| F16L 17/00 | (2006.01) |
| F16L 23/12 | (2006.01) |
| F16L 23/00 | (2006.01) |
| F16L 23/02 | (2006.01) |
| F16L 23/18 | (2006.01) |
| F16L 39/00 | (2006.01) |

(52) U.S. Cl.
CPC ............... *F16L 23/12* (2013.01); *F16L 23/003* (2013.01); *F16L 23/02* (2013.01); *F16L 23/18* (2013.01); *F16L 39/005* (2013.01)

(58) Field of Classification Search
USPC ................. 285/123.15, 123.16, 123.2, 368
See application file for complete search history.

(56) References Cited

U.S. PATENT DOCUMENTS

| 1,497,652 A | 6/1924 | Browne |
| 3,485,516 A | 12/1969 | Keller et al. |
| 5,711,553 A | 1/1998 | Bonser |
| 6,367,846 B1 * | 4/2002 | Aaron, III ............. E21B 17/012 166/335 |
| 6,866,299 B2 * | 3/2005 | Coates ................. B67D 7/0488 141/44 |
| 6,913,291 B1 | 7/2005 | Betz |
| 7,427,084 B1 | 9/2008 | Betz |
| 7,717,473 B1 * | 5/2010 | Zhang ................... F16L 27/026 285/121.1 |
| 8,074,687 B2 | 12/2011 | Queau |
| 8,308,200 B1 | 11/2012 | Barnes et al. |
| 8,820,794 B1 * | 9/2014 | Betz ..................... F16L 33/2076 285/123.15 |
| 2002/0117849 A1 * | 8/2002 | Bailey ...................... A61C 1/18 285/123.15 |
| 2004/0026922 A1 * | 2/2004 | Carns .................... F16L 39/005 285/123.15 |
| 2005/0035591 A1 * | 2/2005 | Graham .................... F28F 9/02 285/123.2 |

FOREIGN PATENT DOCUMENTS

EP 2530294 12/2012

* cited by examiner

*Primary Examiner* — Aaron Dunwoody

(57) ABSTRACT

An assembly for coupling a pair of double-walled tubes is provided. The assembly includes a pair of flanges disposed in an opposing relation to each other and mutually coupled thereto. Each flange defines a central opening that is configured to correspond with a similar opening on an opposing flange. The central openings of the coupled flanges are configured to communicate a first fluid. The assembly further includes an annular hub portion extending axially away from each of the flanges. The annular hub portion is disposed about the central opening of the respective flange. The assembly further includes a lip portion depending frustoconically from the hub portion. The flange, the hub portion, and the lip portion define a conduit extending therethrough. The conduits are configured to allow passage of a second fluid therethrough.

20 Claims, 12 Drawing Sheets

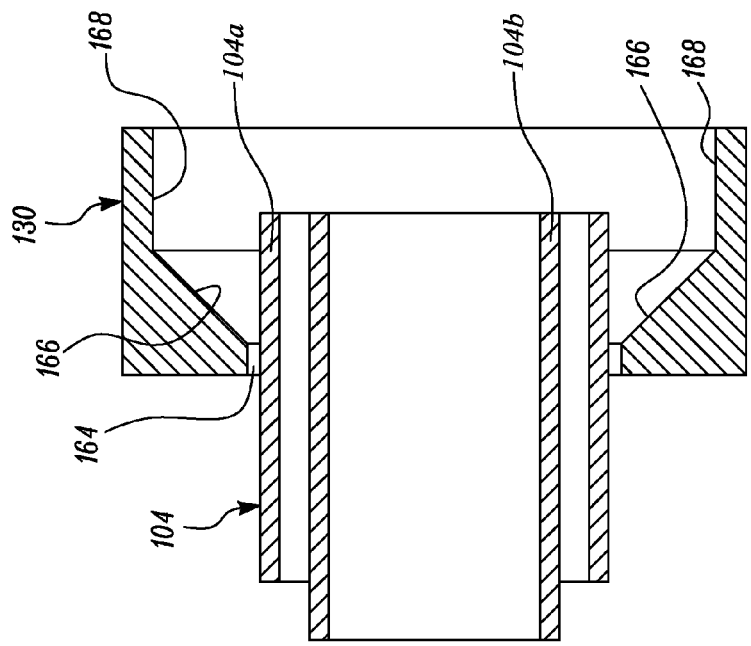
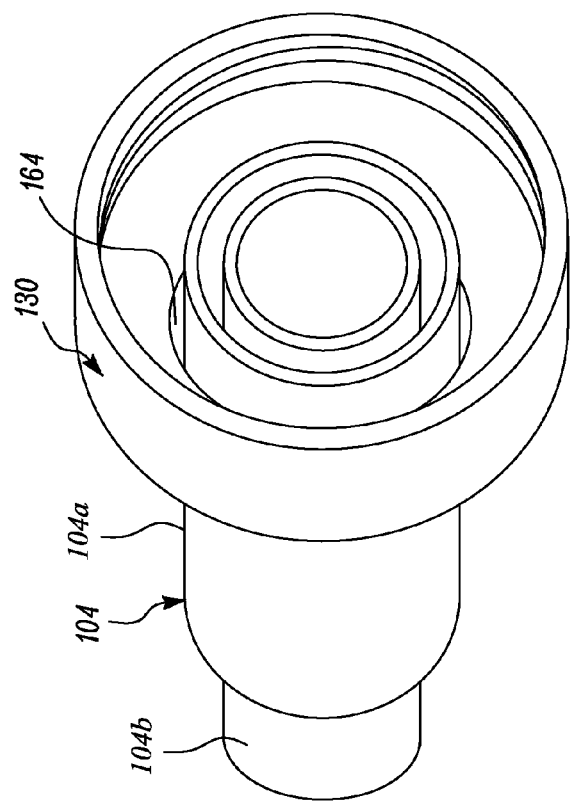
FIG. 8B
FIG. 8A

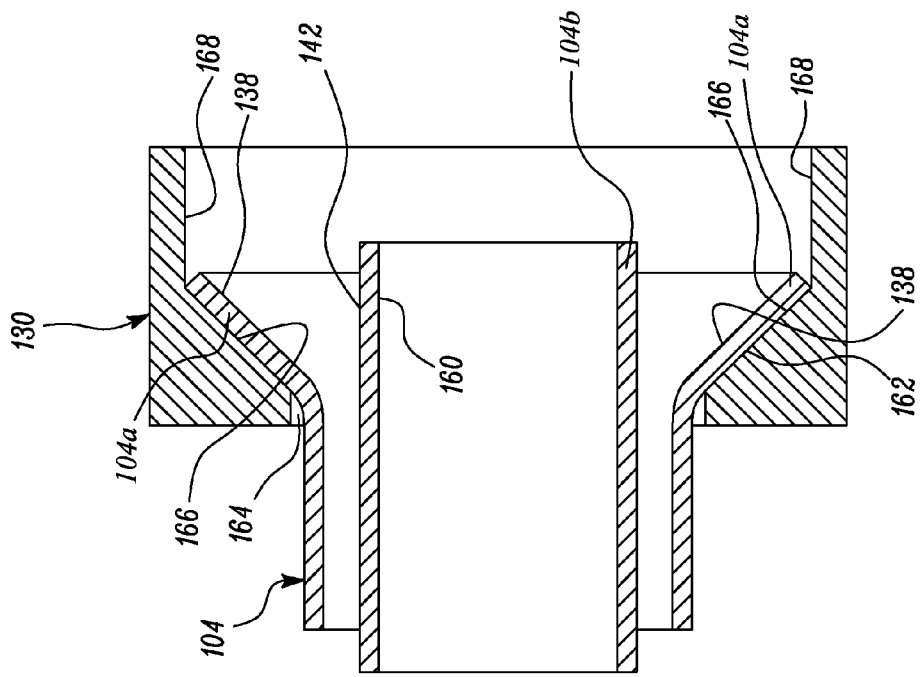
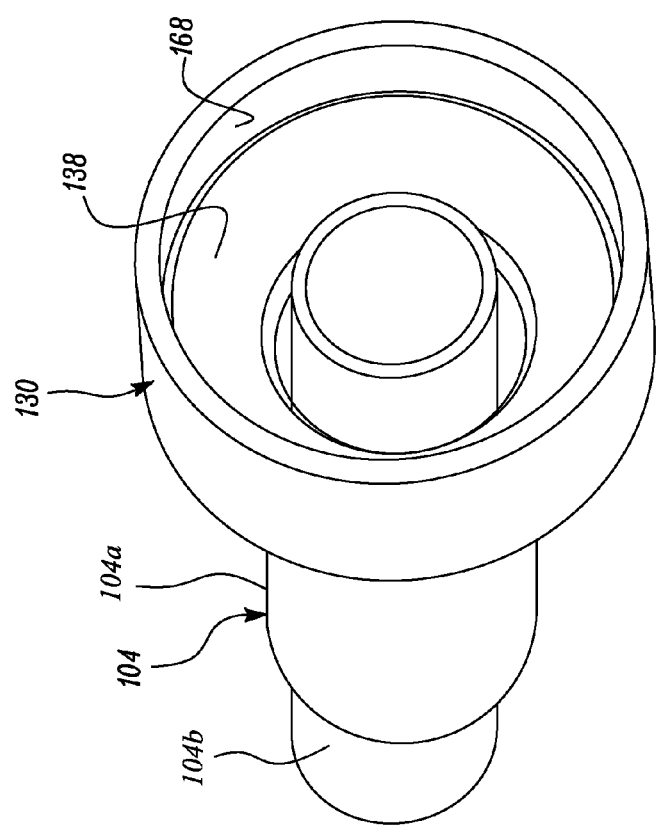
FIG. 9b
FIG. 9a

ASSEMBLY FOR COUPLING A PAIR OF DOUBLE-WALLED TUBES

TECHNICAL FIELD

The present disclosure generally relates to an assembly for coupling a pair of double-walled tubes. More particularly, the present disclosure relates to flanges that allow fluid communication between a pair of corresponding outer tubes and a pair of corresponding inner tubes without allowing the respective fluids to mix with each other.

BACKGROUND

Hydraulic arrangements used in various industrial and commercial applications may employ double-walled pipes to transport fluids from one location to another. These fluids may be similar fluids or dissimilar fluids, i.e. fluids having distinct properties or characteristics. Typically, ends of such double-walled pipes may require coupling in order to accomplish a pair of contiguous flow-paths for the respective fluids.

Many systems have been developed in the past for coupling end portions of adjacently located double-walled pipes. For reference, U.S. Pat. No. 6,913,291 relates to a hose-in-hose coupler. The hose-in-hose coupler has a primary, or inner hose assembly, and a surrounding secondary, or outer hose assembly. The secondary hose assembly is connected by opposing retractable sleeves which, when disconnected, may be retracted or separated to expose the primary hose assembly. However, such systems may be complex and/or laborious to implement in coupling a pair of double-walled pipes.

Therefore, there is a need for a simplified and/or improved system and method to overcome the above mentioned shortcomings.

SUMMARY OF THE DISCLOSURE

In one aspect, the present disclosure discloses an assembly for coupling a pair of double-walled tubes. The assembly includes a pair of flanges disposed in an opposing relation to each other and mutually coupled thereto. Each flange defines a central opening that is configured to correspond with a similar opening on an opposing flange. The central openings of the coupled flanges are configured to communicate a first fluid. The assembly further includes an annular hub portion extending axially away from each of the flanges. The annular hub portion is disposed about the central opening of the respective flange. The assembly further includes a lip portion depending frustoconically from the hub portion. The flange, the hub portion, and the lip portion define a conduit extending therethrough. The conduits are configured to allow passage of a second fluid therethrough.

In another aspect, the present disclosure discloses a method of coupling a pair of double-walled tubes. Each of the double-walled tubes has an outer tube, and an inner tube disposed axially within the outer tube. The method includes inserting each of the double-walled tubes through a collar, the collar having a frustoconical face defined on its inner surface. The method further includes flaring the outer tube of each double-walled tube until an outer surface of the outer tube abuts the frustoconical face. The method further includes releasably coupling a hub portion of an assembly to the collar until a frustoconical lip portion of the assembly abuts with an inner surface of the outer tube. The method further includes flaring the inner tube of each double-walled tube until an outer surface of the inner tube abuts the frustoconical lip portion of the assembly.

Other features and aspects of this disclosure will be apparent from the following description and the accompanying drawings.

BRIEF DESCRIPTION OF THE DRAWINGS

FIGS. 8a to 12b illustrate various stages involved in the process of coupling the pair of the double-walled tubes.

DETAILED DESCRIPTION

Figure 1:
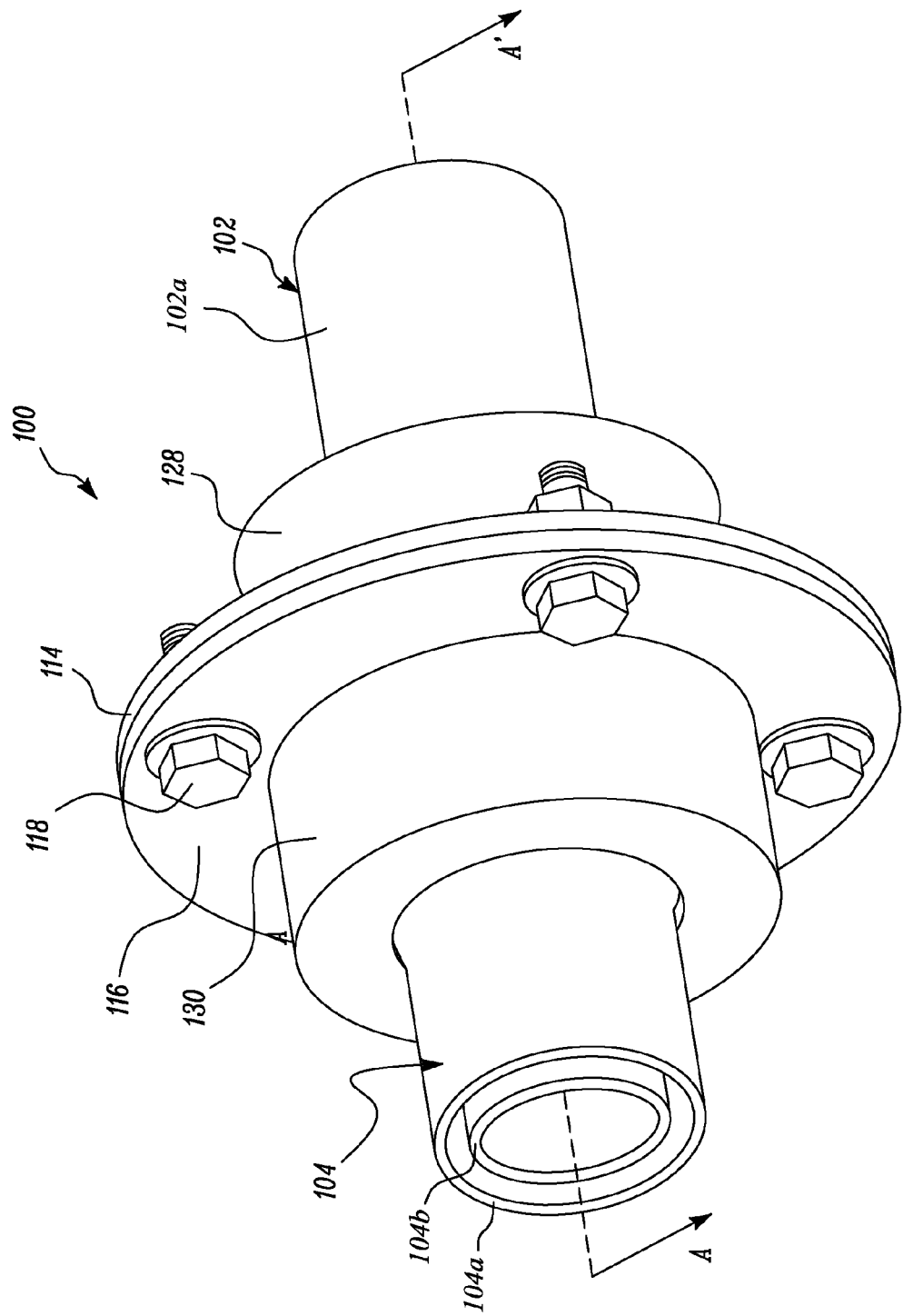
FIG. 1 is a perspective view of an assembly in accordance with an embodiment of the present disclosure.

The present disclosure relates to an assembly for coupling a pair of double-walled tubes. FIG. 1 illustrates an assembly 100 in accordance with an embodiment of the present disclosure. The assembly 100 is used to couple a pair of double-walled tubes 102, 104. In one embodiment, the double-walled tubes 102, 104 may form part of a fluid system that is located between heat exchanging units of a HVAC system (heating, ventilation, and air-conditioning) (not shown). In another embodiment, the double-walled tubes 102, 104 may be employed for transportation of fluids in a boiler system. In an alternative embodiment, the double-walled tubes 102, 104 may be employed in an engine fuel system.

Although a HVAC system, the boiler system, and the engine fuel system are disclosed herein, it is to be noted that an environment or application in which the double-walled tubes 102, 104 are used is non-limiting of this disclosure. One of ordinary skill in the art will acknowledge that the double-walled tubes 102, 104 can be alternatively employed in hydraulic and/or pneumatic arrangements of other commonly known industrial applications.

Figure 2:
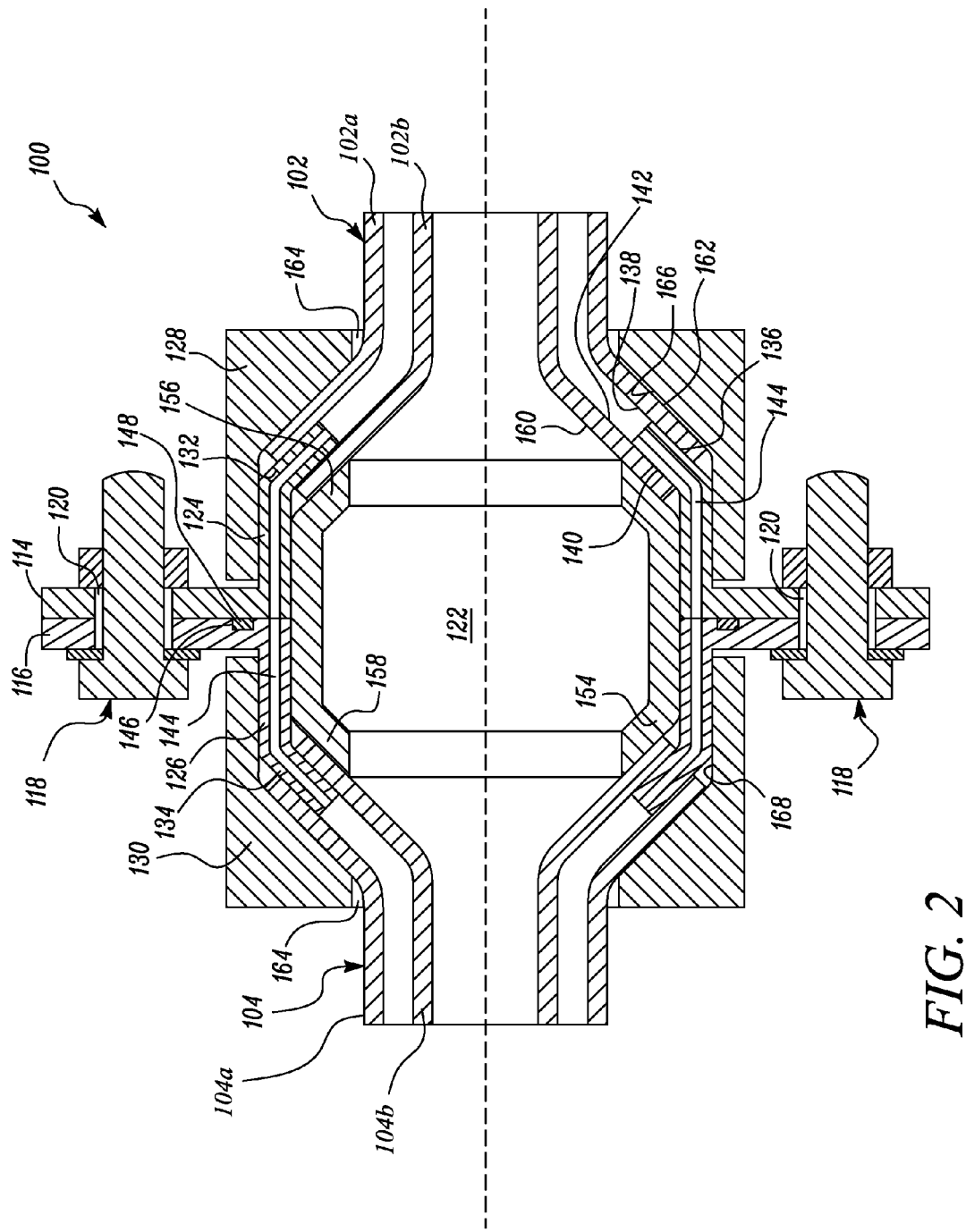
FIG. 2 is a sectional view of the assembly taken along A-A' of FIG. 1.

As shown in FIGS. 1 and 2, each of the double-walled tubes 102, 104 includes an outer tube 102a, 104a and an inner tube 102b, 104b. The outer and inner tubes 102a, 104a; and 102b, 104b of the double-walled tubes 102, 104 may be configured to transport similar or dissimilar fluids, i.e. the fluids may have similar or dissimilar properties/characteristics such as, but not limited to, temperature, pressure, density, mass flow-rate, chemical composition and the like.

Accordingly, in an embodiment of the present disclosure, it is contemplated to use double-walled tubes 102, 104 that are formed from materials such as, but not limited to, plastics, metals, alloys, composite materials, polymers or any other type of material commonly known in the art. For example, the double-walled tubes 102, 104 may be made up of copper, brass, galvanized iron (GI), or steel. As such, one of ordinary skill in the art will acknowledge that the materials for the double-walled tubes 102, 104 may be selected depending on specific requirements of an application.

Referring to FIGS. 1 and 2, the assembly 100 includes a pair of flanges 114, 116 disposed in an opposing relation to each other. The flanges 114, 116 are mutually coupled with the help of fasteners 118. The fasteners 118 are positioned to register in axial alignment with corresponding holes 120 on the flanges 114, 116. As shown, the fasteners 118 include a bolt and nut arrangement.

Alternatively, the fasteners 118 may include bolts alone. These bolts may be threadably engaged with threaded receptacles (not shown) that are provided on one of the two opposing flanges 114, 116. The threaded receptacles may be formed internally, i.e. within the through-holes 120 or other blind holes defined on the flanges 114, 116, by tapping or other methods commonly known to one skilled in the art.

Figure 3:
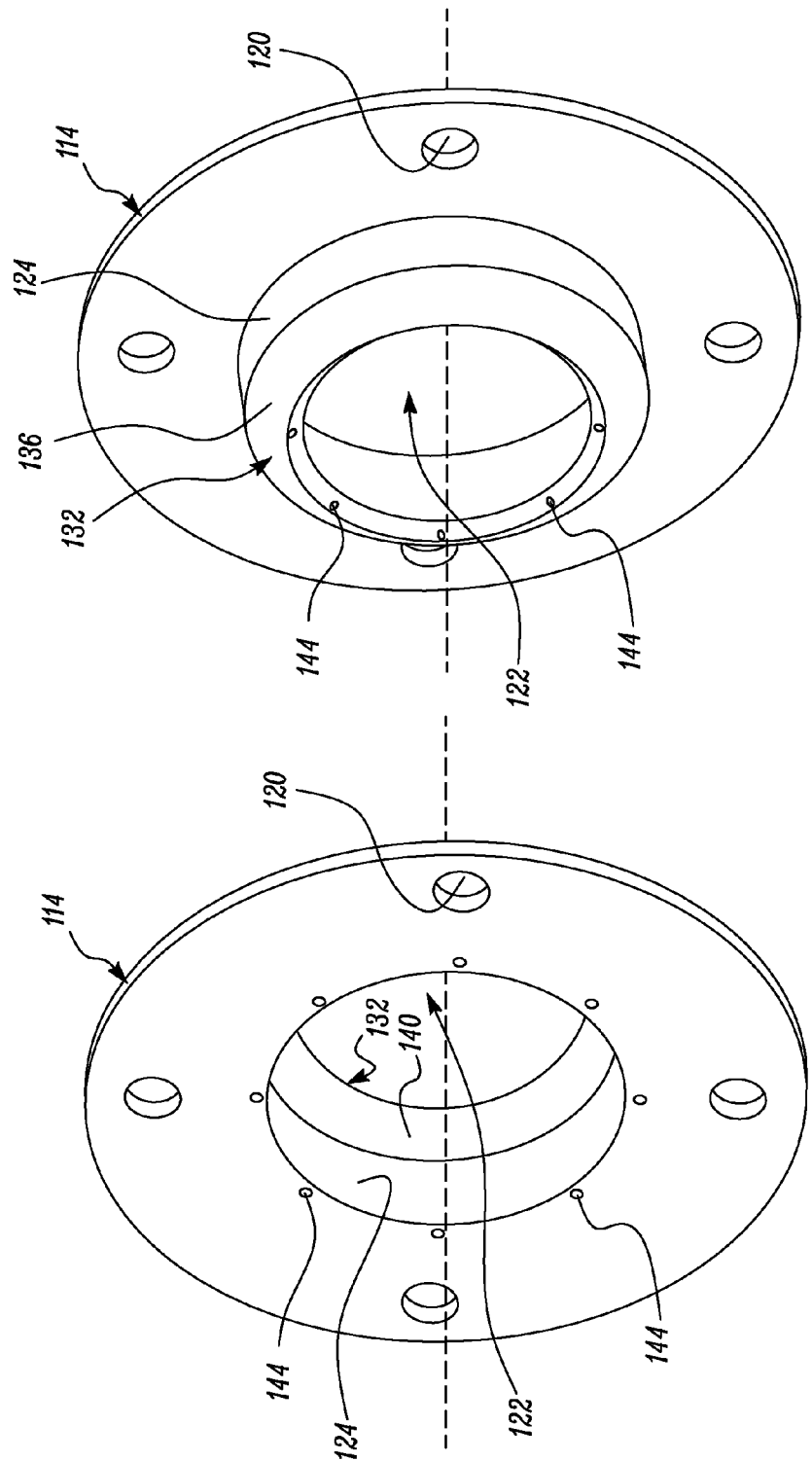
FIGS. 3a and 3b are front and rear perspective views of a flange employed in the assembly of FIGS. 1 and 2.
Figure 4:
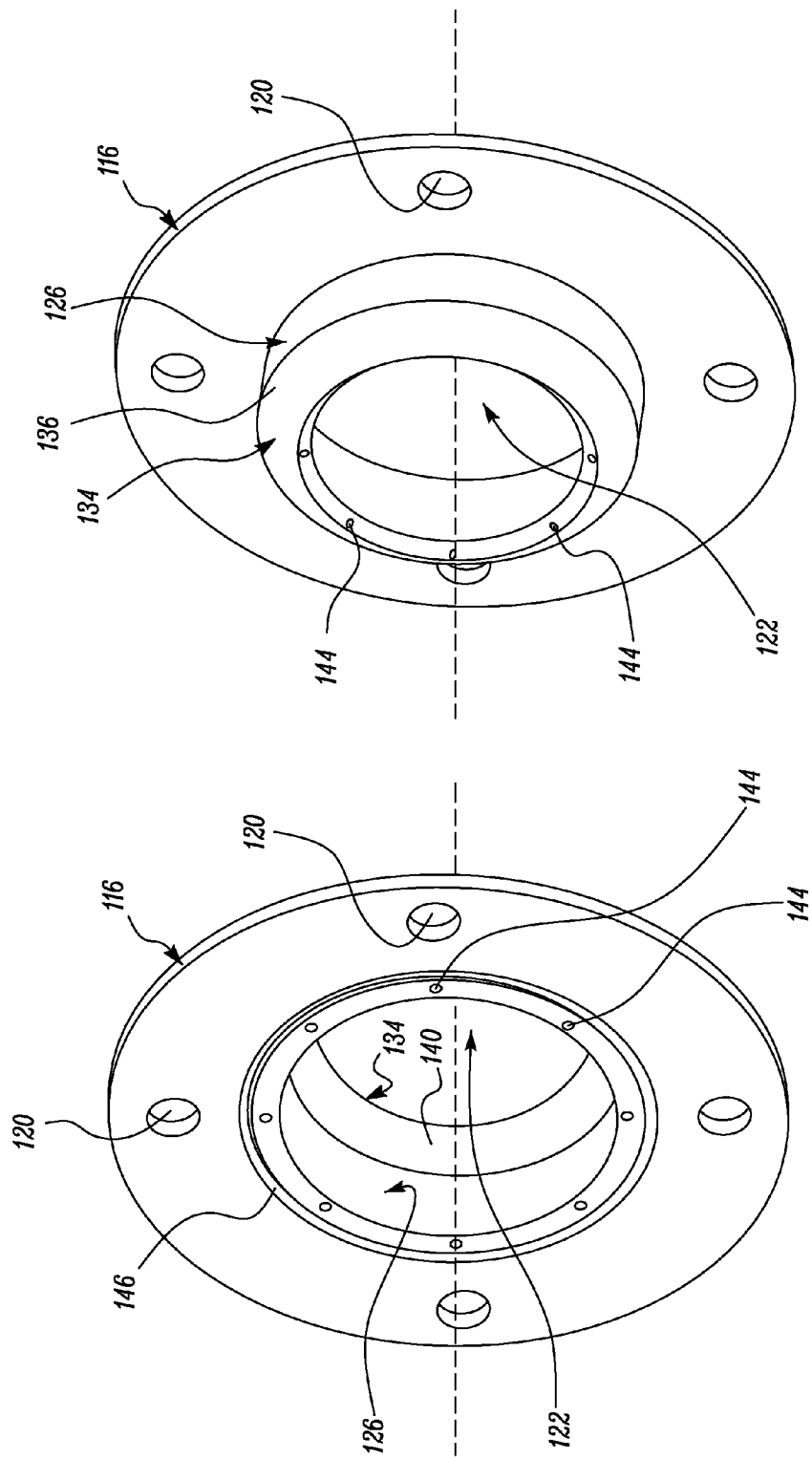
FIGS. 4a and 4b are front and rear perspective views of an other flange employed in the assembly of FIGS. 1 and 2.

FIGS. 3a and 3b illustrate front and rear perspective views of the flange 114 respectively (viewing from a L.H.S of FIG. 2). Similarly, FIGS. 4a and 4b illustrate front and rear perspective views of the other flange 116.

Referring to FIGS. 2, 3a, 3b, 4a, and 4b, each of the flanges 114, 116 defines a central opening 122 that is configured to correspond with a similar opening 122 on an opposing flange 114, 116. As shown in FIG. 2, the central openings 122 of the flanges 114, 116 can form a first fluid passage with the inner tubes 102b and 104b; and can therefore allow communication of a first fluid therethrough.

The assembly 100 further includes an annular hub portion 124, 126 extending axially away from each of the flanges 114, 116. As shown in the rear views of FIGS. 3b and 4b, the annular hub portions 124, 126 are disposed about the central openings 122 of the respective flanges 114, 116.

Moreover, referring to FIGS. 1 and 2, the assembly 100 additionally includes a pair of collars 128, 130 that are configured to releasably couple with the annular hub portions 124, 126. In the illustrated embodiments of FIGS. 1 and 2, the collars 128, 130 are threadably engaged to the hub portions 124, 126. An outer surface of the hub portions 124, 126 are threaded to releasably couple the hub portions 124, 126 to the collars 128, 130. Explanation pertaining to the coupling of the collars 128, 130 to the respective hub portions 124, 126 will be made later in this document.

Referring to FIGS. 2, 3a, 3b, 4a, and 4b, the assembly 100 further includes a lip portion 132, 134 depending frustoconically from the corresponding hub portion 124, 126. As best shown in FIG. 2, the lip portion 132, 134 from each flange 114, 116 is held in abutment between the outer tube 102a/104a and the inner tube 102b/104b of the respective double-walled tube 102, 104. Specifically, the lip portion 132, 134 includes a first face 136 that is configured to abut an inner surface 138 of the outer tube 102a/104a, and a second face 140 that is configured to abut an outer surface 142 of the inner tube 102b/104b.

Moreover, each of the flanges 114, 116 together with the corresponding hub portions 124, 126 and lip portions 132, 134 defines a conduit 144 extending therethrough (multiple conduits 144 are shown in the embodiments of FIGS. 2, 3a, 3b, 4a, and 4b). The conduits 144 are configured to define a second fluid passage with the outer tubes 102a, 104a and may therefore allow passage of a second fluid therethrough. In the illustrated embodiments, the multiple conduits 144 may be defined to allow a larger volume of fluid to pass therethrough.

Further, as shown in FIG. 4a, the flange 116 defines a first annular groove 146 about its central opening 122. Now, referring to FIG. 2, the first annular groove 146 is shown with a deformable O-ring 148 received therein. The O-ring 148 may serve as a seal for the fluids in the assembly 100 by preventing the fluids from seeping out from in between the flanges 114, 116.

Figure 5:
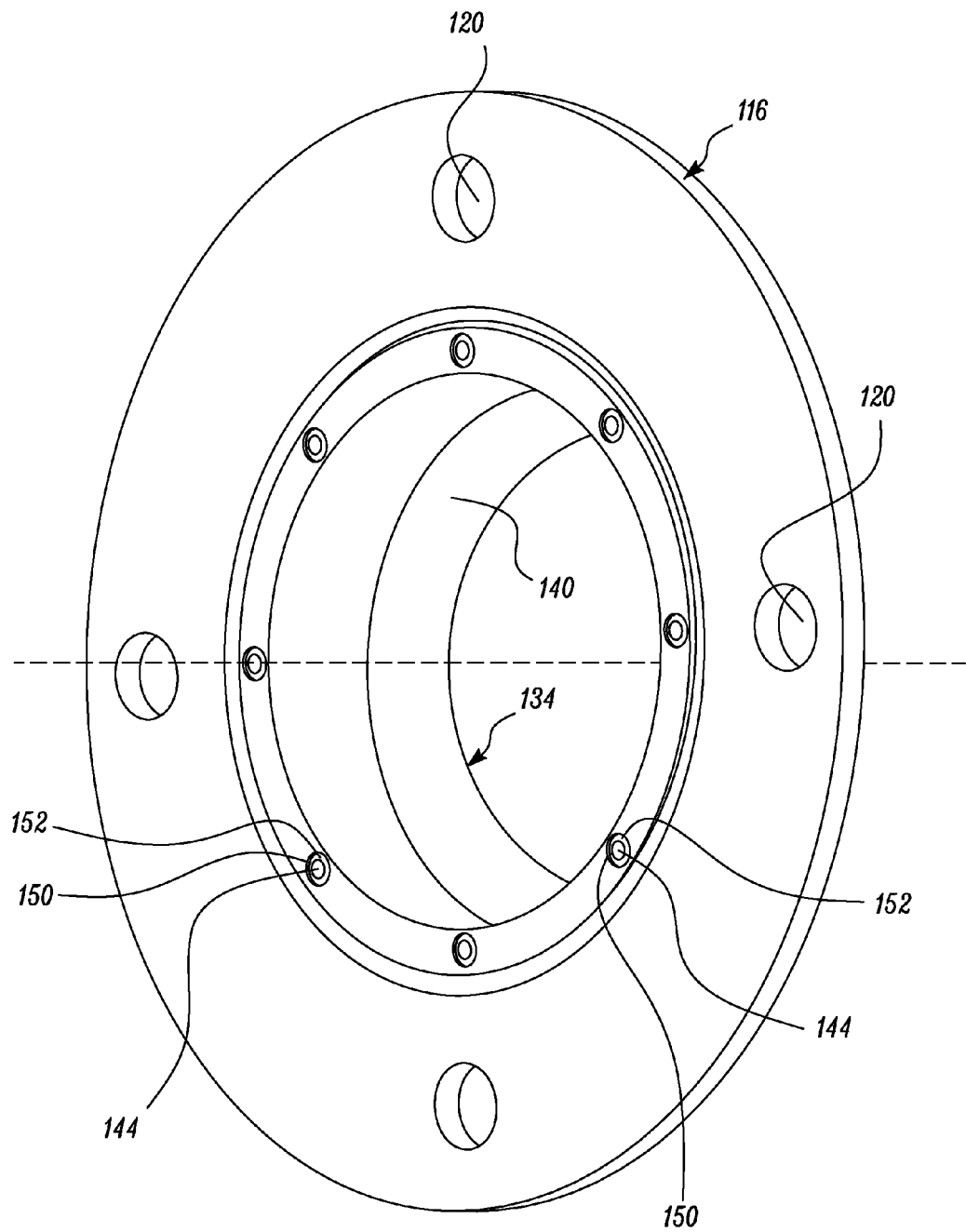
FIG. 5 is a front perspective view of the other flange employed in the assembly of FIGS. 1 and 2.

Alternatively, as shown in FIG. 5, it can also be contemplated to optionally or additionally provide a set of second annular grooves 150 about the conduits 144 from any of the given flanges 114/116. As is the case with the first annular groove 146, each of the second annular grooves 150 may similarly receive deformable O-rings 152 therein. These O-rings 152 may help prevent the first and second fluids, i.e. from the central opening 122, and from the conduits 144, from mixing into each other at a junction of the two flanges 114, 116.

Figure 6:
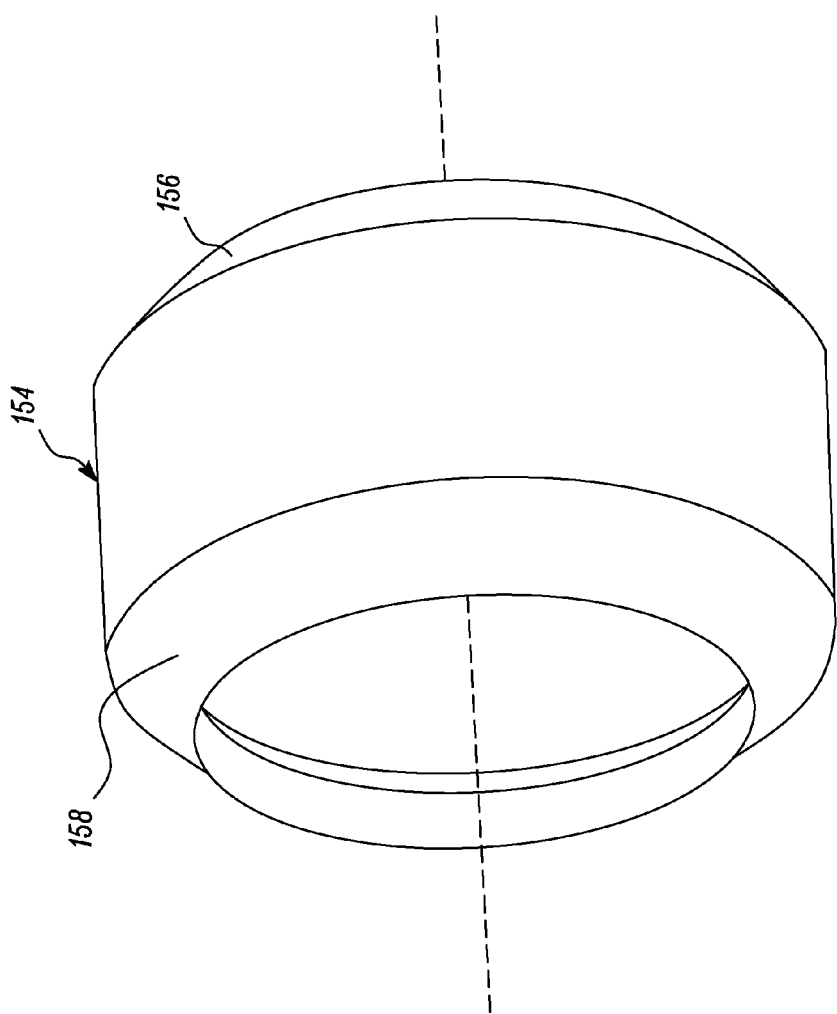
FIG. 6 is front perspective view of a hollow annular capsule employed by the assembly of FIGS. 1 and 2.

Referring now to FIGS. 2 and 6, the assembly 100 further includes a hollow annular capsule 154. The annular capsule 154 includes a pair of skirts 156, 158 defined at ends thereof. The skirts 156, 158 are disposed parallel to frustoconical faces 166 defined on the inner surface 168 of corresponding collars 128, 130. As best shown in FIG. 2, the skirts 156, 158 are disposed in abutment with an inner surface 160 of the inner tubes 102b, 104b.

Referring to FIGS. 1, 2, and 6, it may be noted that the coupling of the collars 128, 130 to the corresponding hub portions 124, 126 is carried out until the inner surface 160 of the inner tube 102b, 104b abuts the corresponding skirt 156, 158 of the hollow annular capsule 154, and the outer surface 142 of the inner tube 102b, 104b meets with or abuts the corresponding lip portion 132, 134 of the respective flange 114, 116. Additionally, the coupling of the collars 128, 130 to the corresponding hub portions 124, 126 is also carried out until the inner surface 138 of the outer tube 102a, 104a abuts the corresponding lip portion 132, 134, and an outer surface 162 of the outer tube 102a, 104a abuts the frustoconical face 166 defined on the inner surface 168 of the collar 128, 130.

This way, any interstitial spaces between the collars 128, 130, the corresponding outer tubes 102a, 104a; the corresponding lip portions 132, 134; the corresponding inner tubes 102b, 104b; and the hollow annular capsule 154 may be closed to create a sandwich-like configuration. Moreover, the sandwich-like configuration may be accompanied by a predetermined amount of compressive load resulting from a tightening of the collar 128, 130 on the corresponding hub portion 124, 126. The compressive load may create a sealing effect and hence, cause the collar 128, 130, the corresponding outer tube 102a, 104a; the corresponding lip portion 132, 134; the corresponding inner tube 102b, 104b; and the hollow annular capsule 154 to seal against their respective adjacent components.

Figure 7:
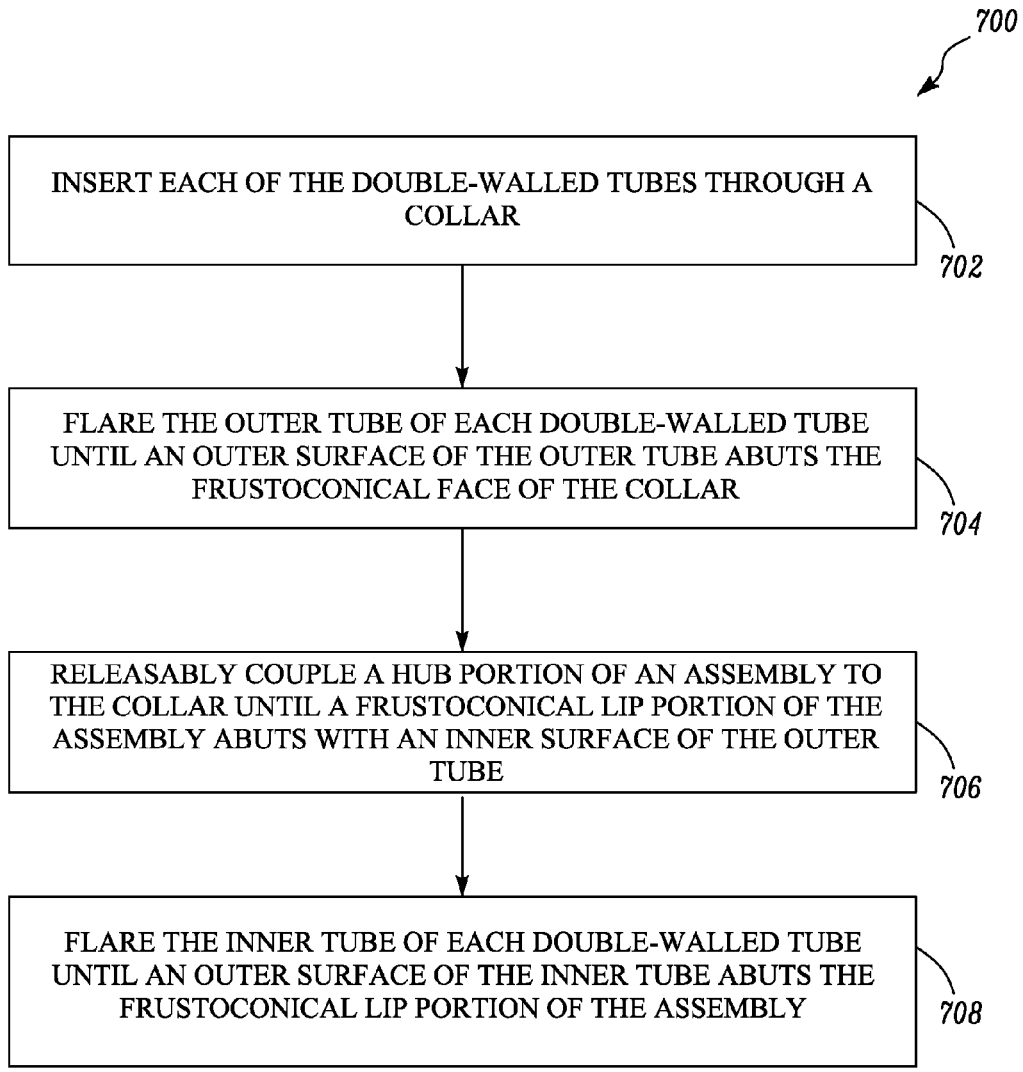
FIG. 7 is a method of coupling a pair of double-walled tubes.

FIG. 7 illustrates a method of coupling a pair of double-walled tubes 102, 104. Explanation pertaining to the steps of the method will hereinafter be made in conjunction with FIGS. 8a to 12b. Moreover, although the steps 702-708 are explained in reference to the double-walled tube 104 and the flange 116, it should be noted that similar steps may be implemented for the double-walled tube 102 and the corresponding flange 114, unless; a variation/addition/modification in such step/s is explicitly specified herein.

At step 702, the method includes inserting the double-walled tube 104 through the collar 130. As shown in FIGS. 8a and 8b, the double-walled tube 104 is shown inserted through an opening 164 in the collar 130.

Referring to FIG. 7, at step 704, the method further includes flaring the outer tube 102a, 104a of each double-walled tube 102, 104 until the outer surface 162 of the outer tube 102a, 104a abuts the frustoconical face 166 of the respective collar 128, 130. Referring to FIGS. 9a and 9b, the outer tube 104a is shown in a flared state such that the outer surface 162 of the outer tube 104a now abuts the frustoconical face 166 of the collar 130.

The flaring operation may be performed by using a flaring cone, a bell-mouthing tool, or may be accomplished by using other methods commonly known to one skilled in the art. Moreover, in view of step 704, it may also be beneficially contemplated at step 702 to adjust an extent of flaring the outer tube 104a, so that upon flaring, adequate material from the outer tube 104a can be disposed in abutment with the frustoconical face 166 of the collar 130.

In one example, the outer tube 104a may be flared to create an overlap of 10 millimeter (0.39 inch) between the outer tube 104a and the frustoconical face 166 of the collar 130. In another example, the outer tube 104a may be flared to create an overlap of 6.35 millimeter (0.25 inch). In yet another example, the outer tube 104a may be flared to create an overlap of up to 76.2 millimeter (3.0 inch).

Although some exemplary values of overlap have been provided herein, such examples are non-limiting of this disclosure. As such, the amount of overlap required between flared components may vary from one application to another depending upon specific requirements of the associated application. Therefore, it is to be understood that other degrees or extents of flare may be suitably implemented in the outer tube 104a depending on specific requirements of an application.

Figure 10B:
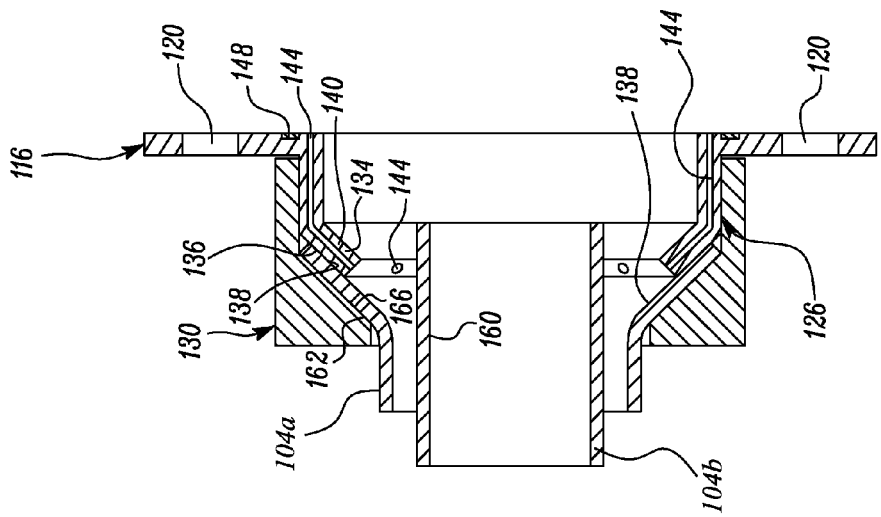
Figure 10A:
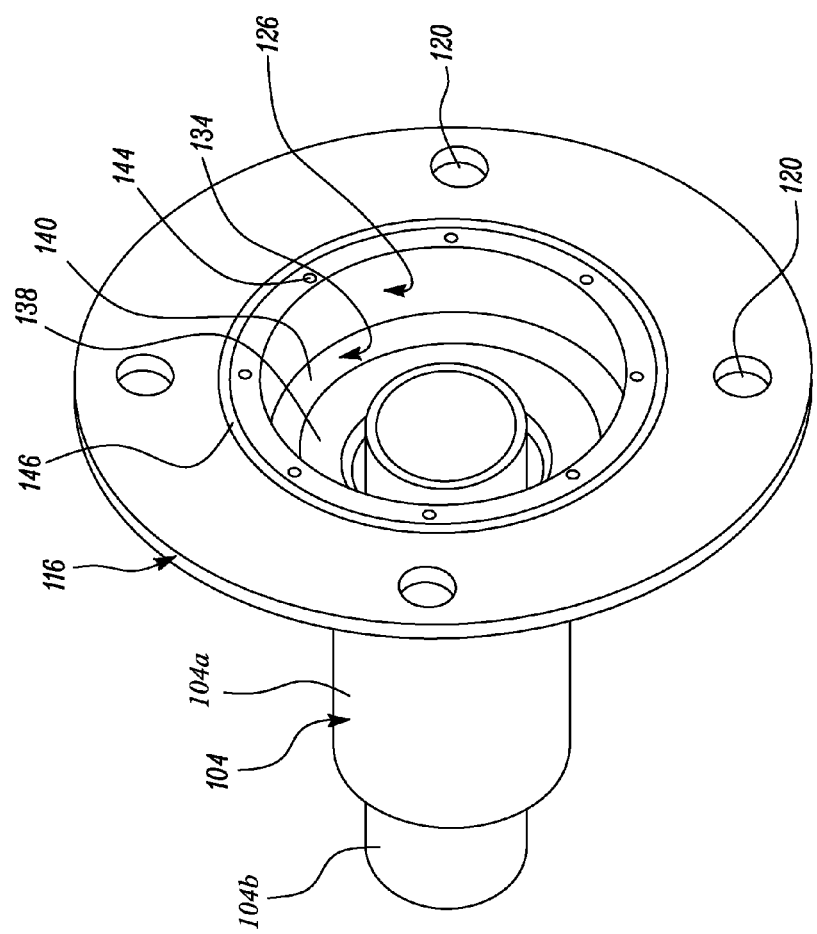

Referring again to FIG. 7, at step 706, the method further includes releasably coupling the hub portion 126 to the collar 130 until the frustoconical lip portion 134 of the flange 116 abuts with the inner surface 138 of the outer tube 104a. Referring to FIGS. 10a and 10b, the hub portion 126 and the collar 130 are shown coupled to each other. As is known to a person ordinarily skilled in the art, the releasable coupling between the hub portion 126 and the collar 130 may be beneficially accomplished by the provision of external and internal threads formed on or within the specified components.

Moreover, with additional tightening of the collar 130 to the hub portion 126, a compressive force can be applied to the outer tube 104a thereby creating a sealing effect between the outer tube 104a and the frustoconical face 166 of the collar 130, and between the outer tube 104a and the frustoconical lip portion 134.

Figure 11B:
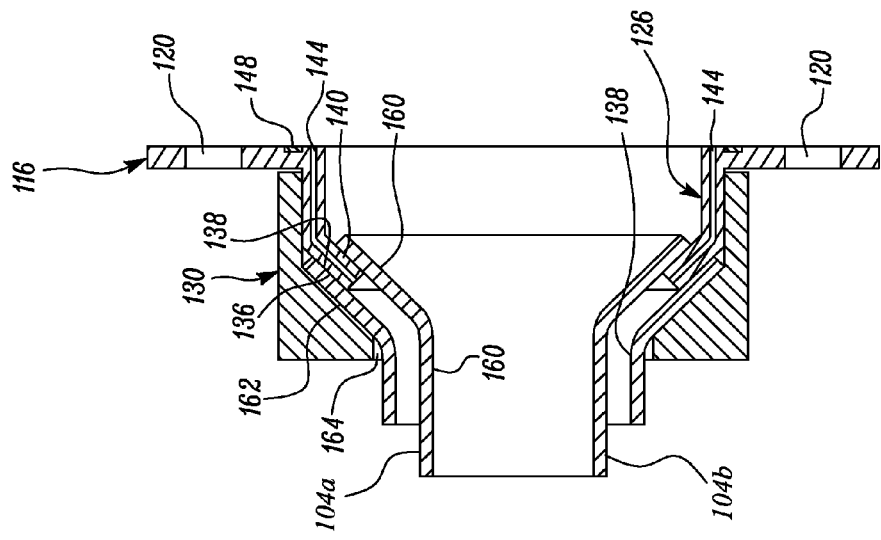
Figure 11A:
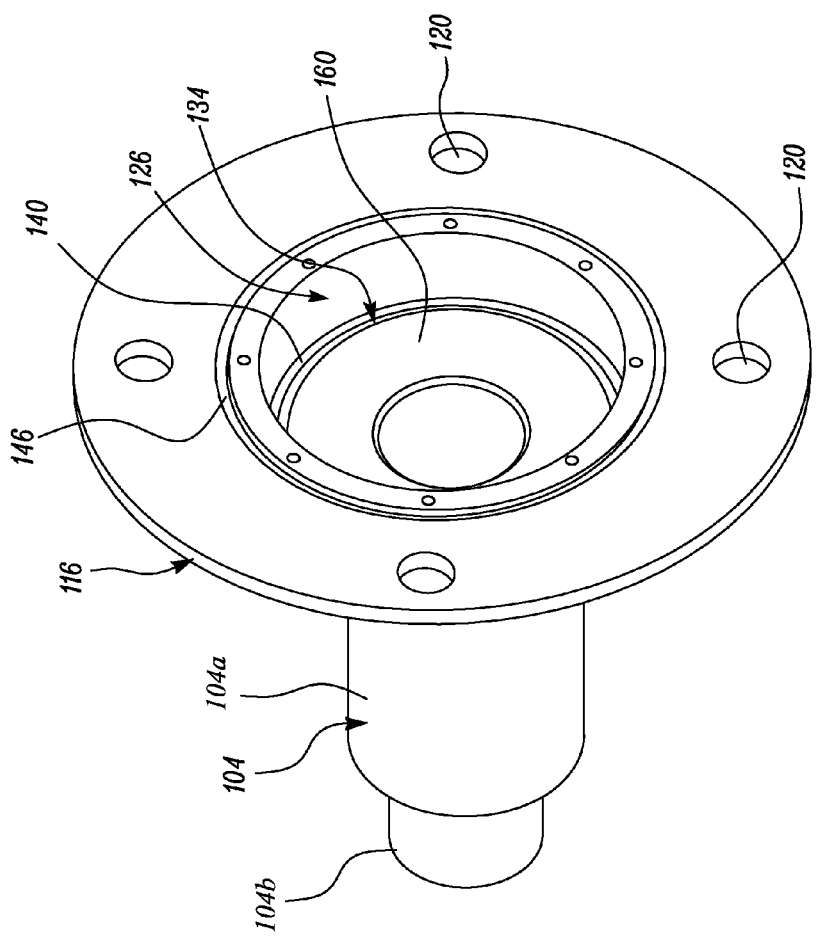

Referring again to FIG. 7, at step 708, the method further includes flaring the inner tube 104b until the outer surface 142 of the inner tube 104b abuts the frustoconical lip portion 134. Referring to FIGS. 11a and 11b, the outer surface 142 is shown in abutment with the lip portion 134.

Figures 12A, 12B:
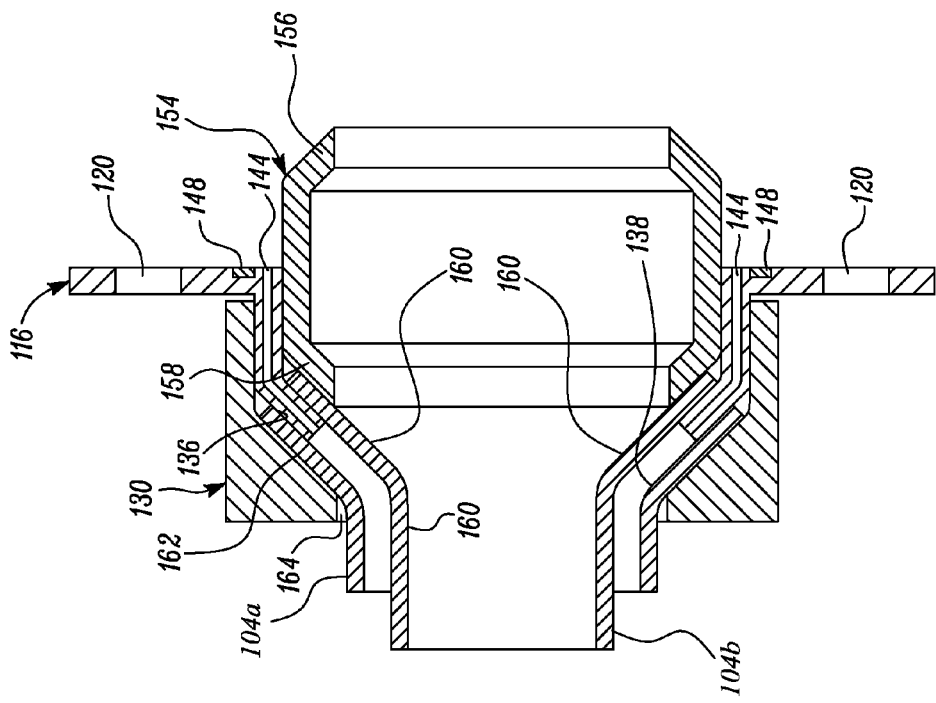

Referring to FIGS. 12a and 12b, the method may additionally include inserting the hollow annular capsule 154 to abut with the inner surface 160 of the flared inner tube 104b. This way, the lip portion 132, 134 may now be held in abutment between the inner tube 104b and the outer tube 104a. Therefore, the hollow annular capsule 154 together with the collar 130 is now configured to hold the outer tube 104a, the lip portion 134, and the inner tube 104b therebetween.

Once the pair of flanges 114, 116 are coupled together using fasteners 118, a compressive force is applied between the frustoconical skirt 156, 158 of the hollow annular capsule 154 and the second face of lip portion 140 of the pair of flanges 114, 116 thus sandwiching the inner tube 102b, 104b to create a seal.

For the sake of brevity in this document and as mentioned earlier herein, the steps 702 to 708 are similarly applied to couple the double-walled tube 102 to the opposing flange 114.

Moreover, upon perusal of the foregoing disclosure, and the accompanying drawings (especially FIG. 2), it may be evident to a person having ordinary skill in the art that a single hollow annular capsule 154 is disposed in abutment with the pair of inner tubes 102a, 104a. Therefore, one of ordinary skill in the art will appreciate that although most components disclosed herein are provided in pairs, only one hollow annular capsule 154 is required to accomplish the coupling of the double-walled pipes. Moreover, the hollow annular capsule 154 can be formed into a multitude of shapes/sizes depending on the size/shape of the tubes or pipes.

Various embodiments disclosed herein are to be taken in the illustrative and explanatory sense, and should in no way be construed as limiting of the present disclosure. All directional references (e.g., inward, outward, radial, upper, lower, upward, downward, left, right, leftward, rightward, L.H.S, R.H.S, top, bottom, above, below, vertical, horizontal, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, engaged, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

In methodologies directly or indirectly set forth herein, various steps and operations are described in one possible order of operation, but those skilled in the art will recognize that steps and operations may be rearranged, replaced, or eliminated without departing from the spirit and scope of the present disclosure as set forth in the claims.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functionalities of components, such features may be omitted from the scope of the present disclosure without departing from the spirit of the present disclosure as defined in the appended claims.

INDUSTRIAL APPLICABILITY

The present disclosure has applicability for implementation and use in various industrial settings such as, but not limited to, HVAC, engine fuel systems, manufacturing, hydraulics, pneumatics, refineries, power plants, construction, and other applications known to one skilled in the art.

With reference to the foregoing disclosure, it may be beneficially contemplated to manufacture each flange 114, 116; the corresponding hub portion 124, 126; and the corresponding lip portion 132, 134 integrally. Various manufacturing process such as, but not limited to, casting, forming, and extruding, are known in the art, and may be readily employed to integrally form such structures and implement the present disclosure. Moreover, the flanges 114, 116; hub portions 124, 126; and lip portions 132, 134 may be formed from a metal, an elastomer, a plastic, or even a composite material depending upon specific requirements of an application. Therefore, a person having ordinary skill in the art will appreciate that the assembly 100 of the present disclosure possesses versatility in design and manufacture thereof to suit various requirements of a given application.

With use of the assembly 100, a fitter may easily and/or quickly couple a pair of double-walled tubes 102, 104. Therefore, the assembly 100 of the present disclosure may accomplish a simple, cost-effective, and reliable fluid connection that can be used in various industrial applications.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An assembly for coupling, the assembly comprising:
    a pair of double-walled tubes, each double-walled tube having an outer tube, and an inner tube disposed axially within the outer tube;
    a pair of flanges disposed in an opposing relation to each other and mutually coupled thereto, each flange defining a central opening that is configured to correspond with a similar opening on an opposing flange;
    an annular hub portion extending axially away from each of the flanges, the annular hub portion disposed about the central opening of the respective flange; and
    a lip portion depending frustoconically from the hub portion, wherein the flange, the hub portion, and the lip portion define a conduit extending therethrough; wherein the central openings of the coupled flanges are configured to communicate a first fluid while the conduits thereof are configured to allow passage of a second fluid.

2. The assembly of claim 1 further comprising a collar configured to releasably couple with the annular hub portion, wherein an inner surface of the collar includes a frustoconical face defined thereon, the frustoconical face disposed parallel to the lip portion.

3. The assembly of claim 2, wherein an outer surface of the outer tube is flared to abut the frustoconical face of the collar.

4. The assembly of claim 3 further including a hollow annular capsule, wherein the hollow annular capsule includes a pair of skirts defined at ends thereof, wherein each skirt is disposed parallel to the frustoconical face of the corresponding collar.

5. The assembly of claim 4, wherein the skirts are disposed in abutment with an inner surface of the inner tubes.

6. The assembly of claim 5, wherein the hollow annular capsule together with the collar is configured to hold the outer tube, the lip portion, and the inner tube therebetween.

7. The assembly of claim 1, wherein the lip portion from each flange is held in abutment between the outer tube and the inner tube of one of the double-walled tubes.

8. The assembly of claim 7, wherein the lip portion includes:
    a first face configured to abut an inner surface of the outer tube; and
    a second face configured to abut an outer surface of the inner tube.

9. The assembly of claim 1, wherein each flange, hub portion, and lip portion is integrally formed from one of a metal, an elastomer, a plastic, and a composite material.

10. The assembly of claim 1, wherein at least one of the flanges is configured to define a first annular groove, the first annular groove disposed about the central opening of the flange and configured to receive a deformable O-ring therein.

11. The assembly of claim 1, wherein at least one of the flanges is configured to define a second annular groove, the second annular groove disposed about the conduit, the second annular groove configured to receive a deformable O-ring therein.

12. The assembly of claim 1 further including:
    a plurality of axially aligned apertures defined on the pair of flanges; and
    a plurality of fasteners configured to register with the axially aligned apertures and fasten the flanges.

13. A method of coupling a pair of double-walled tubes, wherein each double-walled tube has an outer tube, and an inner tube disposed axially within the outer tube, the method comprising:
    inserting each of the double-walled tubes through a collar, the collar having a frustoconical face defined on its inner surface;
    flaring the outer tube of each double-walled tube until an outer surface of the outer tube abuts the frustoconical face;
    releasably coupling a hub portion of an assembly to the collar to abut a frustoconical lip portion of the assembly with an inner surface of the outer tube; and
    flaring the inner tube of each double-walled tube until an outer surface of the inner tube abuts the frustoconical lip portion of the assembly, wherein the assembly includes a flange defining:
        a central opening configured to form a first fluid passage with the inner tubes; and
        a conduit extending through the flange, the hub portion, and the lip portion, the conduit configured to define a second fluid passage with the outer tubes.

14. The method of claim 13 further comprising inserting a hollow annular capsule in abutment with an inner surface of the flared inner tubes, wherein the hollow annular capsule together with the collar is configured to hold the outer tube, the lip portion of the assembly, and the inner tube therebetween.

15. The method of claim 14, wherein a profile of the hollow annular capsule is parallel to the frustoconical face of the collar.

16. The method of claim 14, wherein the hub portion is threadably engaged to the collar to apply a compressive force on the outer tube, the lip portion of the assembly, and the inner tube.

17. The method of claim 13 further comprising providing a sealing arrangement between the central opening and the conduit.

18. The method of claim 17, wherein the sealing arrangement includes a first annular groove disposed about the central opening of the flange, the first annular groove configured to receive a deformable O-ring therein.

19. The method of claim 17, wherein the sealing arrangement includes a second annular groove disposed about the conduit, the first annular groove configured to receive a deformable O-ring therein.

20. The method of claim 13 further including:
    providing a plurality of axially aligned apertures defined on the pair of flanges; and
    fastening the flanges by registering a plurality of fasteners with the axially aligned apertures.

\* \* \* \* \*